3,057,746
COATING METHOD AND ARTICLE PRODUCED THEREBY

Lee O. Edmonds, Bartlesville, Okla., assignor to Phillips Petroleum Company, a corporation of Delaware
No Drawing. Filed Dec. 28, 1959, Ser. No. 862,029
8 Claims. (Cl. 117—21)

This invention relates to a method of preparing coated articles and to the articles produced by this method.

Many articles, particularly metal articles, are coated with resinous materials to improve the surface characteristics thereof or to protect the material of the body of the article.

Polyethylene and similar polyolefins have been used as such protective coatings and such coatings have found use in many applications. However, the adhesion of such coatings is sometimes weak and corrosions of the substrate occurs when coated objects are exposed to a corrosive environment. Temperature cycling is particularly destructive to the coating.

A suitable method of applying such a coating is the fluidized bed coating process described by Gemmer in U.S. Patent 2,844,489. In such fluidized bed coating operations, it is common practice to prepare the surface to be coated by removal of oxides or any residual coatings or contaminants, thus presenting a clean metal surface for reception of the resin and heretofore failures in adhesion have frequently been attributed to imperfect removal of contamination.

The following are objects of this invention.

An object of this invention is to provide a method of preparing articles containing a coating of chlorinated polyethylene. A further object of this invention is to provide a coating method wherein the adherence of the chlorinated polyethylene to the material coated is improved. A further object of this invention is to provide a method whereby the fluidized bed coating operation can be used to prepare coated articles having a strongly adherent resinous coating.

Other objects and advantages will be apparent to one skilled in the art upon reading this disclosure.

I have discovered that coatings of the polyethylene type will be substantially more adherent to an article if the surface to be coated is previously given an intermediate coating of an epoxy resin and if the polyethylene is mildly chlorinated. Thus, the process of my invention involves two steps, one a pre-treatment of the surface to be coated by application thereto of an epoxy resin and thereafter coating the treated article with chlorinated polyethylene. The chlorination of the polyethylene produces a material which is much more strongly adherent than unchlorinated polyethylene.

In another aspect, my invention relates to a coated article having at least a first and second coating, said first coating being a cured epoxy resin and said second coating being chlorinated polyethylene.

The epoxy resin serves two functions, the first to provide a surface to which the polymer adheres more firmly, the second to stabilize the chlorine-containing polymer. Chlorination of the polymer reduces cracking tendencies and renders it more adherent to the substrate. While application of the chlorinated polymer directly to the metal surface provides firmly adherent coatings, decomposition sometimes occurs during the baking step, giving rise to gaseous byproducts which cause bubbling of the coating. The resulting poorly coated areas provide sites where corrosion can be initiated.

One might think that admixture of the epoxy resin with the chlorinated polymer prior to application would provide the desired stabilization as well as firmly adherent, stable coatings. However, it has been found that while firmly adherent coatings can be applied when operating in this manner, decomposition takes place, the coatings are dark in color, and objectionable bubbling of the coating occurs.

When operating according to the present process, the previously cleaned metal surface is precoated with a solution of the epoxy resin by a dipping, brushing, or spraying procedure, after which the solvent is removed and the resin cured by heating. Removal of solvent can be effected by air drying or in the heating step. Heat curing is effected at a temperature in the range between 300 and 500° F. for from one second to one minute. While at the curing temperature, the heated object is plunged into a fluidized bed of pulverulent polyethylene which has been previously subjected to mild chlorination. The object is then subjected to a post-heating treatment at a temperature in the range between 300 and 500° F. for from one to five minutes to smooth the coating. Ordinarily coatings having adequate thickness are obtained by a single dipping in the fluidized bed. However, if thicker coatings are desired, the dipping can be repeated, in each instance being followed by the heat smoothing operation.

Chlorination of the polyethylene can be effected in any suitable manner. One method for such chlorination is to dissolve the resin in a chlorinated solvent such as carbon tetrachloride and pass into the system the calculated amount of chlorine to provide the desired chlorine content, catalyzing the reaction with actinic light. The polymer is then coagulated, recovered, and dried. The polymer is then pulverized to a particle size which will pass a 40 mesh screen and is then applicable for use in the fluid bed process of the invention.

The chlorinated polyethylene of the examples was chlorinated by pulverizing the resin to the desired degree of fineness for use in the coating process and tumbling the powder in a drum in the presence of elemental chlorine under the influence of actinic light. When so operating it is preferable that the ground polymer be in a fairly narrow range of particle size, say to pass a 40 mesh screen and be retained on a 100 mesh screen. By so operating, the polymer is chlorinated homogenously within the desired range. From this procedure the chlorinated product can be used directly in the process of the invention.

The chlorination is continued to provide a product containing 3 to 12, preferably 5 to 10, percent chlorine by weight.

The epoxy resins used in the first step of the process of my invention are substances well known in the art, being characterized by having active epoxide groups or oxirane rings in the molecular structure. Two types of these resins have received considerable attention in recent years.

One type of these resins are known in the art as glycidyl polyethers. Such epoxides or ethers may be obtained by reacting predetermined amounts of at least one polyhydric phenol and at least one epihalohydrin in an alkaline medium. Phenols which are suitable for use in preparing such resinous polymeric epoxides include those which contain at least two phenolic hydroxy groups per molecule. Polynuclear phenols which have been found to be particularly suitable include those wherein the phenol nuclei are joined by carbon bridges, such, for example, as di-(4-hydroxyphenyl)dimethylmethane (referred to hereinafter as bis-phenol "A"), di-(4-hydroxyphenyl)methylmethane and di-(4-hydroxyphenyl)methane. In admixture with the named polynuclear phenols, use also may be made of those polynuclear phenols wherein the phenol nuclei are joined by sulfur bridges, such for example as di-(4-hydroxyphenyl)sulfone.

While it is preferred to use epichlorohydrin as the epihalohydrin in the preparation of the resinous polymeric epoxide starting materials of the present invention, epibromohydrin and the like also may be used advantageously.

In the preparation of the resinous polymeric epoxides, aqueous alkali is employed to combine with the halogen of the epihalohydrin reactant. The amount of alkali employed should be substantially equivalent to the amount of halogen present and preferably should be employed in an amount somewhat in excess thereof. Aqueous mixtures of alkali metal hydroxides, such as potassium hydroxide and lithium hydroxide, may be employed although it is preferred to use sodium hydroxide since it is relatively inexpensive.

The product of the reaction, instead of being a single simple compound, is generally a complex mixture of glycidyl polyethers, but the principal product may be represented by the formula:

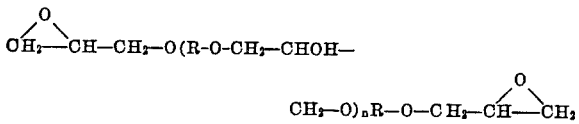

where $n$ is an integer of the series 0, 1, 2, 3 . . . , and $R$ represents the divalent hydrocarbon radical of the dihydric phenol. While for any single molecule of the polyether $n$ is an integer, the fact that the obtained polyether is a mixture of compounds causes the determined value for $n$, from molecular weight measurement, to be an average which is not necessarily zero or a whole number. Although the polyether is a substance primarily of the above formula, it may contain some material with one or both of the terminal glycidyl radicals in hydrated form.

The simplest polyether is a diglycidyl diether of the dihydric phenol which contains a single divalent aromatic hydrocarbon radical from the dihydric phenol and has two glycidyl radicals linked thereto by ethereal oxygen atoms. More generally, the polyether is of more complex character and contains two or more aromatic hydrocarbon radicals alternating with glyceryl groups in a chain which are linked together by intervening ethereal oxygen atoms.

The resinous polymeric epoxide, or glycidyl polyether of a dihydric phenol suitable for use in this invention, has an epoxy value (equivalent per 100 grams of resin) in the range of 0.03 to 0.80 and epoxy equivalent (grams resin per gram-mol epoxide) in the range of 100 to 4000. These include both solid and liquid materials. Solvents are generally used with both types.

Resinous polymeric epoxides or glycidyl polyethers suitable for use in accordance with this invention may be prepared by admixing and reacting from one to two mol proportions of epihalohydrin, preferably epichlorohydrin, with about one mol proportion of bis-phenol "A" in the presence of at least a stoichiometric excess of alkali based on the amount of halogen.

To prepare the resinous polymeric epoxides, aqueous alkali, bis-phenol "A" and epichlorohydrin are introduced into and admixed in a reaction vessel. The aqueous alkali serves to dissolve the bis-phenol "A" with the formation of the alkali salts thereof. If desired, the aqueous alkali and bis-phenol "A" may be admixed and the epichlorohydrin added thereto, or an aqueous solution of alkali and bis-phenol "A" may be added to the epichlorohydrin. In any case, the mixture is heated in the vessel to a temperature within the range of about 80° to 110° C. for a period of time varying from about one-half hour to three hours, or more, depending upon the quantities of reactants used.

Upon completion of heating, the reaction mixture separates into layers. The upper aqueous layer is withdrawn and discarded, and the lower layer is washed with hot water to remove unreacted alkali and halogen salt, in this case, sodium chloride. If desired, dilute acids, for example, acetic acid or hydrochloric acid, may be employed during the washing procedure to neutralize the excess alkali.

The second type of epoxy resins are those prepared from liquid diene polymers by treatment thereof with peracids or peroxides in the presence of an acidic catalyst. The liquid polymers can be prepared by methods known in the art, one method being that described in Crouch 2,631,175. Such a polymer, generally in solution, is treated with the active oxygen containing material and epoxidized until it contains 0.08 to 0.8 epoxy group per aliphatic double bond originally present in the polymer.

When the epoxidized liquid polymer is prepared from a homopolymer of butadiene, the products are characterized in that the original unsaturated portion of the molecule is converted by the epoxidation reaction to units of which (1) 8 to 80 percent, preferably 13 to 50 percent, of said units are selected from the group consisting of

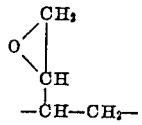

and

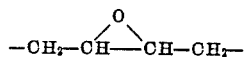

(2) up to 82 percent, preferably 50 to 77 percent, of said units are selected from the group consisting of

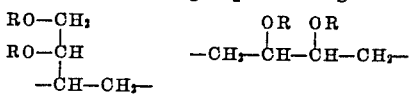

where $R$ is selected from the group consisting of H and

$R_1$ being an alkyl, aryl, alkaryl, or aralkyl group of one to 20 carbon atoms, and (3) 10 to 35 percent of said units are selected from the group consisting of

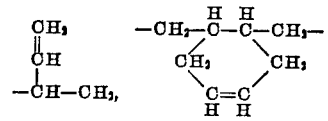

and

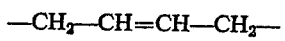

One example of the preparation of such an epoxidized liquid polymer can be found in Wheelock Patent No. 2,914,490. The particular method of making the epoxidized liquid polymer is not a feature of the present invention.

Curing agents for epoxy resins include aliphatic and aromatic polyamines, polyhydric phenols, polybasic acids, anhydrides and polyhydric alcohols.

For their application, the epoxy resins are dissolved in a solvent such as methylisobutyl ketone or methyl cellosolve, mixed with toluene, xylene, or benzene. The resin is applied by dipping, brushing, or spraying and baked or air dried, baking being preferred in the practice of the present invention.

In preparing the surface for coating, surface grease or contamination is removed, preferably by grit blasting, after which the epoxy resin base coat is applied as previously described. In some instances a small amount of a leveling agent such as a phenol-formaldehyde or urea-formaldehyde condensation product can be added to the epoxy resin. Prior to applying the coating, the catalyst or hardening agent is added to the epoxy resin solution. The coating should be cured prior to application of the chlorinated polymer since the epoxy resin acts as a base coat to which the chlorine-containing polymer adheres and not as an adhesive per se.

After the surface to be coated is suitably conditioned by application of the epoxy resin, it is heated to a temperature in the range between 300 and 500° F. and plunged into the fluidized chlorinated polymer. Since it is preferable to heat the epoxy resin-coated article to cure the resin, it is convenient to take the coated article directly from the curing zone into the fluidized coating zone.

The time for heating the epoxy resin coated article will be only slightly longer than the time required to reach the desired temperature level and will be determined by the composition mass of the article. After the required temperature is reached, an additional heating period from one second to one minute is adequate. The smoothing or post-heating step can be quite short, being concerned principally with surface characteristics, and can be from about five to about thirty seconds although longer periods can be used if desired, say from one to five minutes.

The coatings obtained are smooth and attractive in appearance, adhere strongly even after extended thermal cycling, undergo severe bending without cracking, and are highly resistant to corrosive environment.

When colored articles are desired, it is possible to include pigments in either of the coating layers.

EXAMPLE I

Epoxy resin varnish was prepared according to the following recipe:

| | |
|---|---|
| Araldite 6060 [1] _____pounds__ | 4.64 |
| Xylene _____do____ | 1.04 |
| Methylisobutyl ketone _____do____ | 1.04 |
| Methyl "Cellosolve" _____do____ | 1.04 |
| Beetle 216-8 [2] _____grams__ | 30 |

[1] Epichlorohydrin-bisphenol—A reaction product having the following properties:
Epoxy value (equivalent/100 g. resin)_____ 0.24
Epoxy equivalent (g. resin/g.-mol epoxide)_____ 417
Specific gravity (40% solution in butyl "Carbitol")____ 1.12
Melting point (Durrans) ° C_____ 67
Viscosity (Gardner Holt 40% solution in butyl "Carbitol") 25° C_____ D
[2] Phenol-formaldehyde condensation product.

The solvents were mixed and the epoxy resin dissolved in the mixture, after which the Beetle 216-8 was added and the mixture stirred until solids were dissolved.

A catalyst solution was prepared using the following recipe:

| | Pounds |
|---|---|
| Diethylenetriamine _____ | 0.287 |
| Xylene _____ | 0.144 |
| Butanol _____ | 0.144 |

The catalyst solution was combined with the varnish in a weight ratio of 0.072/1.0. Steel coupons 1" x 4" x 0.064" were grit blasted, dipped in the catalyst-containing varnish and dried in air. The coated coupons were heated for four minutes at 450° F., dipped in a fluidized bed of powdered chlorinated polyethylene, and post-heated for four minutes at 450° F. to smooth the coating. The polyethylene was a "high density" material prepared according to the method of Hogan and Banks, Patent 2,825,721. A portion of the coupons were subjected to temperature cycling, the remainder were tested for corrosion resistance.

Temperature cycling tests were conducted by immersing the coupon in boiling water for 10 minutes, then in ice water for 10 minutes, repeating the operation for increasing numbers of cycles. After the required number of cycles was completed the coupons were bent through 180 degrees over a one-inch mandrel and a razor cut made transversely across the middle of the bend. Observations of adhesion were based on (1) cracking of the coating in the bend and (2) drawback at the razor cut.

Corrosion resistance was determined by immersing the coupons to half their length in 40 percent sulfuric acid and in 10 percent solutions of sodium chloride in water, the acid and salt solutions being maintained at 160° F. for the duration of the test. Corrosion effects were estimated by visual observation.

Results of these tests are shown in the following tabulations:

Table I
CHLORINATED POLYETHYLENES USED FOR COATINGS

| Run No.: | Chlorine Percent |
|---|---|
| 1 | None |
| 2 | 1.9 |
| 3 | 1.8 |
| 4 | 6.8 |
| 5 | 7.2 |
| 6 | 9.2 |

Table II
TEMPERATURE CYCLING TESTS

| Cycles | Run No. | | | | | |
|---|---|---|---|---|---|---|
| | 1 | 2 | 3 | 4 | 5 | 6 |
| 0 | vsc [a] | sc [b] | OK | OK | OK | OK |
| 2 | lc [c] | mlc [d] | vsc | 1/32" dr.[e] | OK | OK |
| 4 | lc | pa [f] | vsc | 1/8" dr | 1/16" dr | 1/8" dr |
| 6 | lc | pa | 1/8" dr | 1/16" dr | 1/32" dr | 1/4" dr |
| 8 | lc | vpa | 1/8" dr | 3/16" dr | 1/32" dr | 1/4" dr |
| 10 | lab [g] | co [h] | 1/4" loose | 1/8" dr | 1/32" dr | 1/4" dr |

[a] Very small cracks.
[b] Small cracks.
[c] Large cracks.
[d] Many large cracks.
[e] 1/32" drawback at cut.
[f] Poor adhesion.
[g] Loose at bend.
[h] Cracked off.

In this very severe test the coatings from 6.8 and 7.2 percent chlorine-containing polyethylenes remained firmly adherent with very little drawback at the cut.

Table III
CORROSION TESTS IN 40% NaCl AT 160° F.

| Run | 8 day | 13 day | 19 day | Comments |
|---|---|---|---|---|
| 1 | Failed | | | Cracks, vapor phase area. |
| 2 | ufc [a] | ufc | Failed | Do. |
| 3 | sc [b] | sc | do | Cracks. |
| 4 | sc | sc | do | ufc, poor adhesion. |
| 5 | sc | sc | do | Do. |
| 6 | vsc [c] | vsc | OK | Fair adhesion. |

[a] Under-film corrosion.
[b] Slight corrosion.
[c] Very slight corrosion along edges where coated defects may have been present.

Table IV
CORROSION TESTS IN 10% $H_2SO_4$ AT 160° F.

| Run | 8 day | 13 day | 19 day |
|---|---|---|---|
| 1 | OK | OK | Edge failure. |
| 2 | Edge failure | Edge failure | |
| 3 | OK | OK | OK. |
| 4 | Edge failure | OK | OK. |
| 5 | do | Edge failure | |
| 6 | OK | OK | OK. |

In these tests all failures appeared to arise from coating defects along edges of the coupons.

EXAMPLE II

Steel coupons as described in Example I were grit blasted and coated with powdered chlorinated polyethylene (7.5% chlorine) as before. One set of coupons was precoated with the epoxy resin varnish of Example I. Another set was run as controls, no base coat being applied. After the smoothing post heating step, it was noted that the coatings applied over the base coat were smooth and bubble free. Those on which no precoat was used showed numerous bubbles, rendering the coating unattractive in appearance and providing points of weakness at which corrosion could be initiated.

EXAMPLE III

Steel coupons as used in the previous examples and coated by the fluidized bed technique, using a powdered polyethylene containing about 7.0 percent chlorine which had been mixed with a solution of an epoxy resin in a mixture of acetone, xylene, methylisobutylketone and methyl cellosolve. The resin solution was added to the chlorinated polyethylene powder to provide a ratio of resin to polymer of 1/20. The slurry obtained was spread on a plate and left for several hours in air to remove solvent. When dry the product was ground and the portion passing a 40 mesh screen used for powder coating the coupons. While fairly good adhesion was realized, the coatings were very dark in color and did not smooth satisfactorily when heated. Numerous bubbles formed in the coating, showing that when operating in this manner, decomposition of the chlorinated polymer was not prevented.

While I have disclosed the invention using polyethylene as the olefin polymer, other polyolefins can be used. Solid polymers of higher olefins, such as propylene and butylene, are quite suitable as are copolymers, such as the copolymer of ethylene and butylene. Both high and low density olefin polymers can be used.

As many possible embodiments can be made of this invention without departing from the scope thereof, it is to be understood that all matter herein set forth is to be interpreted as illustrative and not as unduly limiting the invention.

I claim:

1. A coating process comprising applying to an article a coating of an epoxy resin selected from the group consisting of (1) glycidyl ethers derived from a dihydric phenol and an epihalohydrin and (2) epoxidized liquid diene polymers containing 0.08 to 0.8 epoxy group per aliphatic double bond originally present in the polymer, curing said coating, and applying a second coating of chlorinated polyethylene.

2. The process of claim 1 wherein said epoxy resin is a glycidyl ether derived from a dihydric phenol and an epihalohydrin.

3. The process of claim 1 wherein said epoxy resin is a glycidyl ether derived from di-(4-hydroxyphenyl)dimethylmethane and epichlorohydrin.

4. The process of claim 1 wherein said epoxy resin is an epoxidized liquid diene polymer containing 0.08 to 0.8 epoxy group per aliphatic double bond originally present in the polymer.

5. The process of claim 4 wherein said epoxidized liquid polymer is epoxidized liquid polybutadiene.

6. A coating process comprising applying to an article a coating of an epoxy resin selected from the group consisting of (1) glycidyl ethers derived from a dihydric phenol and an epihalohydrin and (2) epoxidized liquid diene polymers containing 0.08 to 0.8 epoxy group per aliphatic double bond originally present in the polymer, curing said coating, immersing the coated article into a fluidized bed containing particles of chlorinated polyethylene while said article is heated to a temperature below the deterioration temperature of the article but at least as high as the sintering temperature of the chlorinated polyethylene.

7. A coating process comprising applying to a metal article a varnish, said varnish comprising a glycidyl polyether derived from a dihydric phenol and an epihalohydrin, a phenol-formaldehyde reaction product, a solvent and curing catalyst; drying said varnish coating; heating the article to a temperature of 300 to 500° F. for a time of 1 second to 1 minute to cure said varnish; dipping the article while heated to said temperature of 300 to 500° F. into a fluidized bed of chlorinated polyethylene, said chlorinated polyethylene containing 3 to 12 percent chlorine by weight; and heating the article after removal from the fluidized bed at a temperature of 300 to 500° F. for 1 to 5 minutes.

8. A coating process comprising applying to a metal article a first coating comprising a glycidyl polyether derived from a dihydric phenol and an epihalohydrin, heating the article to a temperature of 300 to 500° F. for a time of 1 second to 1 minute to cure said coating; dipping the article while heated to said temperature of 300 to 500° F. into a fluidized bed of chlorinated polyethylene, said chlorinated polyethylene containing 3 to 12 percent chlorine by weight; and heating the article after removal from the fluidized bed at a temperature of 300 to 500° F. for 1 to 5 minutes.

References Cited in the file of this patent

UNITED STATES PATENTS

| | | |
|---|---|---|
| 2,594,979 | Nelson | Apr. 29, 1952 |
| 2,682,515 | Naps | June 29, 1954 |
| 2,844,557 | Welch | July 22, 1958 |
| 2,888,364 | Bauer | May 26, 1959 |
| 2,914,490 | Wheelock | Nov. 24, 1959 |
| 2,962,387 | Noeske et al. | Nov. 29, 1960 |
| 2,997,776 | Matter et al. | Aug. 29, 1961 |
| 3,008,848 | Annonio | Nov. 14, 1961 |

FOREIGN PATENTS

| | | |
|---|---|---|
| 563,281 | Canada | Sept. 16, 1958 |
| 1,042,442 | Germany | Oct. 30, 1958 |